US010310935B2

(12) United States Patent
Gao et al.

(10) Patent No.: US 10,310,935 B2
(45) Date of Patent: *Jun. 4, 2019

(54) DYNAMICALLY RESTORING DISKS BASED ON ARRAY PROPERTIES

(71) Applicant: International Business Machines Corporation, Armonk, NY (US)

(72) Inventors: Xue Dong Gao, Shanghai (CN); Yang Liu, Shanghai (CN); Mei Mei, Shanghai (CN); Hai Bo Qian, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 114 days.

This patent is subject to a terminal disclaimer.

(21) Appl. No.: 15/353,781

(22) Filed: Nov. 17, 2016

(65) Prior Publication Data
US 2018/0137004 A1   May 17, 2018

(51) Int. Cl.
*G06F 11/07* (2006.01)
*G06F 1/20* (2006.01)
*G06F 1/3206* (2019.01)

(52) U.S. Cl.
CPC .......... *G06F 11/0793* (2013.01); *G06F 1/206* (2013.01); *G06F 1/3206* (2013.01); *G06F 11/073* (2013.01)

(58) Field of Classification Search
CPC ......... G06F 11/10; G06F 11/106; G06F 11/07
USPC ....................................................... 714/6.22
See application file for complete search history.

(56) References Cited

U.S. PATENT DOCUMENTS

| | | | | |
|---|---|---|---|---|
| 7,278,067 | B1* | 10/2007 | Coatney | G06F 11/1076 714/54 |
| 7,434,012 | B1* | 10/2008 | Ives | G06F 11/106 711/112 |
| 8,255,772 | B1* | 8/2012 | Foley | G11C 29/028 714/718 |
| 8,892,939 | B2 | 11/2014 | Belhadj et al. | |
| 2003/0191888 | A1* | 10/2003 | Klein | G06F 1/3225 711/105 |
| 2006/0090098 | A1* | 4/2006 | Le | G06F 11/008 714/6.12 |
| 2008/0010499 | A1* | 1/2008 | Vingralek | G06F 11/008 714/6.11 |
| 2009/0070647 | A1* | 3/2009 | Allison | G06F 11/106 714/746 |

(Continued)

OTHER PUBLICATIONS

Gao et al. "Dynamically Restoring Disks Based on Array Properties", U.S. Appl. No. 15/894,041, filed Feb. 12, 2018, 18 pages.

(Continued)

*Primary Examiner* — Kamini B Patel
(74) *Attorney, Agent, or Firm* — Khyle J. Eaton; Brian M. Restauro

(57) ABSTRACT

Embodiments of the present invention provide systems and methods for dynamically modifying data scrub rates based on RAID analysis. The method includes determining a grouping for an array based on a temperature for the array, a configurable threshold temperature range for the array, and an I/O distribution of the array. The method further includes modifying the data scrub rate for the array based on the grouping.

17 Claims, 4 Drawing Sheets

(56) References Cited

U.S. PATENT DOCUMENTS

| | | | |
|---|---|---|---|
| 2009/0070648 A1* | 3/2009 | Allison | G06F 11/106 714/746 |
| 2011/0173484 A1* | 7/2011 | Schuette | G06F 11/0727 714/2 |
| 2012/0284575 A1 | 11/2012 | Foley | |
| 2013/0275653 A1* | 10/2013 | Ranade | G06F 3/0605 711/103 |
| 2014/0052924 A1* | 2/2014 | Ramaraju | G06F 12/12 711/133 |
| 2014/0143594 A1 | 5/2014 | Belhadj | |
| 2014/0245062 A1* | 8/2014 | Cooper | G06F 11/1092 714/6.22 |
| 2015/0006998 A1* | 1/2015 | Cordero | G06F 11/106 714/773 |
| 2015/0169398 A1* | 6/2015 | Chunn | G06F 11/106 714/763 |
| 2016/0054937 A1* | 2/2016 | Tuers | G11C 7/04 711/103 |
| 2016/0098216 A1* | 4/2016 | Huang | G06F 11/1072 714/37 |
| 2016/0155491 A1* | 6/2016 | Roberts | G11C 11/40607 711/106 |
| 2018/0032400 A1* | 2/2018 | Lesartre | G06F 11/142 |

OTHER PUBLICATIONS

Appendix P—List of IBM Patents or Patent Applications Treated as Related, Filed herewith, 2 Pages.
Paris, et al.; "Improving Disk Array Reliability Through Expedited Scrubbing"; 2010 IEEE Fifth International Conference on Networking, Architecture and Storage (NAS); Jul. 2010; 7 pages.

* cited by examiner

DYNAMICALLY RESTORING DISKS BASED ON ARRAY PROPERTIES

BACKGROUND OF THE INVENTION

The present invention relates generally to the field of RAID restoration, and more particularly to dynamically restoring RAIDs based on properties of the array.

Redundant array of independent disks (RAID) is a data storage virtualization technology used for data redundancy, performance improvement, or both. Often, a data scrub is performed on the RAID by a RAID adaptor. The data scrub scans and verifies available customer data on the array. When errors are detected during a data scrub, they can be corrected via an array read reconstruct.

Often, in RAID data rebuilding, the system comprises a data scrub, performed at a specific rate, and a rebuilding access. In some instances, where the data scrub is performed after the rebuilding access, a window can be exposed on an array, resulting in data loss. Additionally, a data scrub can interfere with a customer's ability to write data to a RAID.

SUMMARY

According to one embodiment of the present invention, a method for modifying data scrub rates is provided. The method includes determining, by one or more processors, a grouping for an array of a plurality of arrays based, at least in part, on a temperature for the array, a configurable threshold temperature range for the array, and an I/O distribution of the array; and modifying, by one or more processors, a data scrub rate for the array based, at least in part, on the grouping of the array.

According to another embodiment of the present invention, a computer program product for modifying data scrub rates is provided, based on the method described above.

According to another embodiment of the present invention, a computer system for modifying data scrub rates is provided, based on the method described above.

DETAILED DESCRIPTION

An embodiment of the present invention recognizes that many methods of data scrubbing redundant array of independent disks (RAIDs) leave the potential risk of causing data loss. In some instances, where the data scrub rate is a predetermined frequency (e.g., every four days), the potential data loss is high. Data loss can occur when the data scrub occurs after rebuilding access, which can cause media loss on the array. In some instances, where the data scrub occurs after rebuilding access, the data scrub can leave a window in the array. The window can leave data vulnerable and at a risk of data loss. Traditionally, data loss is minimized by increasing the data scrub rate to ensure the RAID is scrubbed before rebuilding access. However, the data scrub limits a customer's access to the RAID, which can affect a customer's application. Therefore, a simple static increase of the RAID scrub rate is not an ideal solution.

An embodiment of the present invention provides a means to dynamically vary the data scrub rate to reduce the possibility of data loss. By monitoring whether a disk in the RAID is hot and the input/output (I/O) of the disk, the data scrub rate can be dynamically controlled to improve customer access to the RAID while minimizing the risk of data loss. In this manner, as described in greater detail in this specification, embodiments of the present invention can shorten the window between the data scrub and RAID rebuild by adjusting the data scrub rate automatically, based, at least in part, on I/O distribution on the array.

Figure 1:
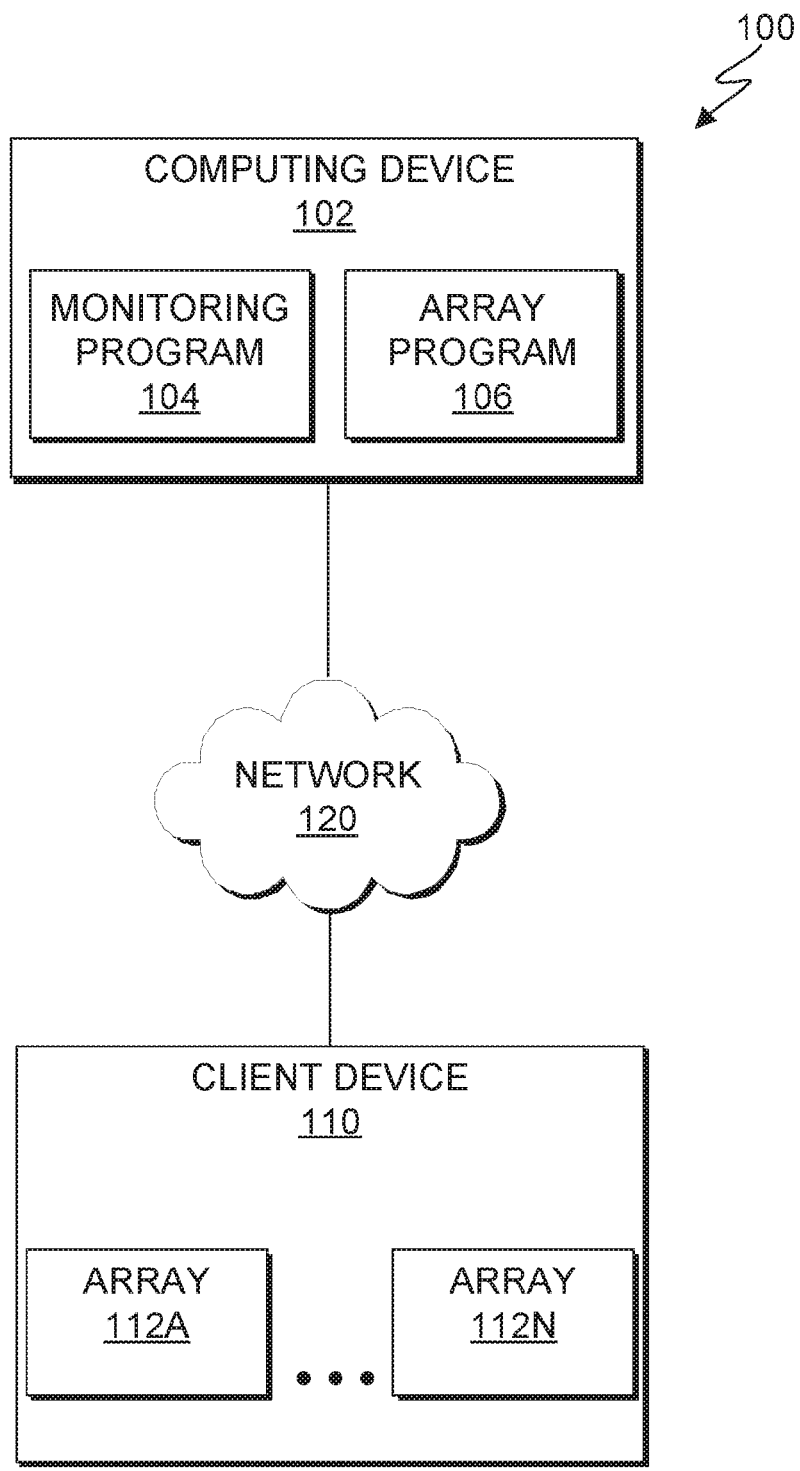
FIG. 1 is a functional block diagram illustrating a computing environment, in accordance with an embodiment of the present invention.

The present invention will now be described in detail with reference to the Figures. FIG. 1 is a functional block diagram illustrating a computing environment, in accordance with an embodiment of the present invention. For example, FIG. 1 is a functional block diagram illustrating computing environment 100. Computing environment 100 includes computing device 102 and client device 110 connected over network 120. Computing device 102 includes monitoring program 104 and array program 106.

In various embodiments, computing device 102 and client device 110 are both a computing device that can be a standalone device, a server, a laptop computer, a tablet computer, a netbook computer, a personal computer (PC), a desktop computer, or any programmable electronic device capable of communicating with each other via network 120. In another embodiment, computing device 102 represents a computing system utilizing clustered computers and components to act as a single pool of seamless resources. In this embodiment, computing device 102 includes monitoring program 104 and array program 106 and is responsible for monitoring the status of individual RAID disks and classifying arrays of the individual RAID disks. In general, computing device 102 can be any computing device or a combination of devices with access to client device 110, and with access to and/or capable of executing some or all of monitoring program 104, array program 106, and array 112A-N. Computing device 102 may include internal and external hardware components, as depicted and described in further detail with respect to FIG. 4.

In various embodiments, client device 110 includes array 112A-N. Each of array 112A-N can be used to store client information. In some embodiments, information is stored on multiple array 112A-N, to create redundant backups of the client information.

In an exemplary embodiment, monitoring program 104 and array program 106 are stored on computing device 102. In other embodiments, one or both of monitoring program 104 and array program 106 may reside on another computing device, provided that each can access and is accessible by each other of monitoring program 104, array program 106 and array 112A-N. In yet other embodiments, one or both of monitoring program 104 and array program 106 may be stored externally and accessed through a communication network, such as network 120.

Network 120 can be, for example, a local area network (LAN), a wide area network (WAN) such as the Internet, or a combination of the two, and may include wired, wireless, fiber optic or any other connection known in the art. In general, network 120 can be any combination of connections and protocols that will support communications between computing device 102 and client device 110, in accordance with a desired embodiment of the present invention.

Monitoring program 104 operates to monitor the status of individual RAID disks and manage the data scrub rate of the RAID disks. In some embodiments, monitoring program 104 detects the temperature of each array in the RAID. In some embodiments, the temperature of an array is used to determine whether the array is in use. For example, where an array is at an elevated temperature (e.g., above ambient temperature), monitoring program 104 determines that the array is in use. In another example, where the array is near ambient temperature, monitoring program 104 determines that the array is not in use. In some embodiments, the data scrub rate of an array in the RAID is dynamically changed based on whether the array is in use. For example, arrays that are in use are not scrubbed, so as to not interfere with a customer's applications. In another example, an array that is determined to not be in use may have the scrub rate increased, to ensure the data is scrubbed before the rebuilding process. In some embodiments, the data scrub rate is also dependent on the level of use of the array. For example, the scrub rate is more frequently increased for arrays that are frequently used by the customer. In another example, the scrub rate for arrays that are infrequently written to are infrequently changed. In other embodiments, monitoring program 104 detects the use rates of the I/O of the RAID disks through other means, such customer I/O strength and distribution.

Array program 106 operates to classify and manage array 112A-N based on the I/O of data on the array. The classification is described in further detail below, with reference to FIG. 2. Array program 106 interfaces with monitoring program 104 to determine if the scrub rate of an array in the RAID should be increased or decreased. In some embodiments, array program 106 will increase the scrub rate for arrays that have a low workload. For example, arrays that are cold (i.e., ambient temperature) are determined to have a low workload. In another embodiment, array program 106 decreases the scrub rate for arrays determined to have a high workload. For example, arrays that are hot are determined to have a high workload. In still another embodiment, array program 106 will return an array's scrub rate back to a predetermined rate in response to array program 106 determining an array has a normal workload. The term normal workload may be defined by the owner of the array, an industry standard, the manufacturer of the array, etc. For example, array program 106 determines that the temperature of an array is decreasing, after previously recording as hot, and so array program 106 returns an array's scrub rate back to the predetermined rate for the decreased temperature. In other embodiments, array program 106 determines that array program 106 should return an array's scrub rate back to the predetermined rate due to a drop in the customer I/O strength (i.e., access speed, amount of access, etc.) and distribution across the raid.

Figure 2:
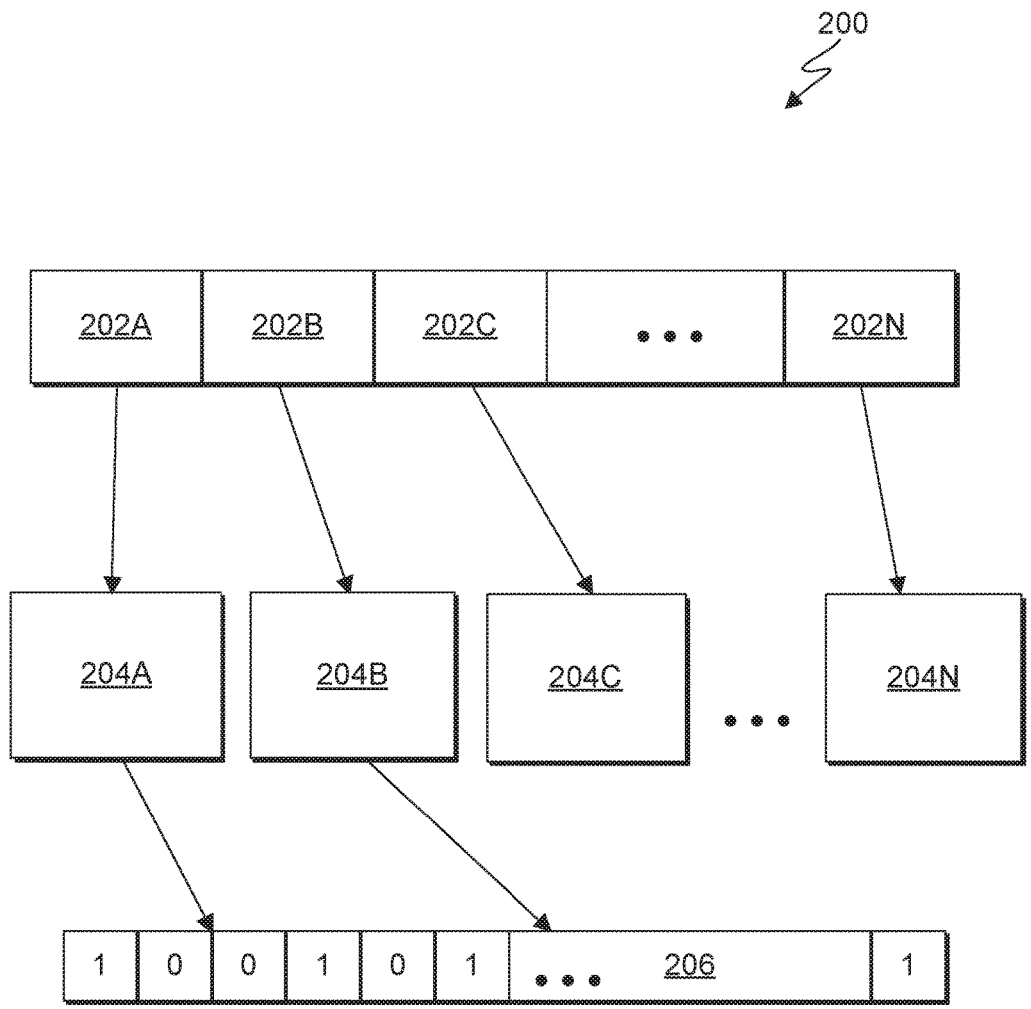
FIG. 2 is a flowchart depicting I/O distribution of a RAID, on a computing device within the computing environment of FIG. 1, in accordance with an embodiment of the present invention.

FIG. 2 is a flowchart depicting I/O distribution 200 of a RAID, on a computing device within the computing environment of FIG. 1, in accordance with an embodiment of the present invention. For example, FIG. 2 is a flowchart depicting RAID distribution determined by array program 106, on computing device 102 within computing environment 100.

Rank grouping 200A-N are used to group RAIDs with similar input/output (I/O) together. An assignment of a RAID into one of rank grouping 202A-N determines the scrub rate of the RAID. In this embodiments, three rank groupings are used, rank grouping 202A, rank grouping 202B, and rank grouping 202C. However, more or fewer rank groupings can be used. Array program 106 determines which rank grouping to place a RAID in based on the RAIDs I/O. In this example, rank grouping 202A is for high I/O, rank grouping 202B is for normal I/O, and rank grouping 202C is for low I/O. Monitoring program 104 communicates with array program 106 to assign a RAID to a specific rank grouping. In some embodiments, monitoring program 104 has specific thresholds for assigning a RAID to a specific rank grouping. For example, in some embodiments, 50% of RAIDs are distributed to rank grouping 202C, 30% of RAIDs are distributed to rank grouping 202B, and 20% of RAIDs are distributed to rank grouping 202A, based on their I/O levels. In some embodiments, rank grouping 202A-N distribution can be modified by a user. In another embodiment, rank grouping 202A-N distribution can be modified by monitoring program 104, in response to system needs. Array program 106 then assigns a scrub rate to each rank grouping 202A-N. For example, RAIDs in rank grouping 202B (i.e., RAIDs with normal I/O) have a scrub rate defined by the system (i.e., a scrub rate similar to industry standards). In this example, rank grouping 202A (i.e., RAIDs with a high I/O) will be assigned a higher scrub rate (e.g., twice the system scrub defined rate). Further, rank grouping 202C (i.e., RAIDs with a low I/O) will be assigned a low scrub rate (e.g., half the system defined scrub rate).

In some embodiments, in order to determine the scrub rate of the RAID, the RAID will be split into several segments that can be measured. For example, if a RAID has a total capacity of 300 GB, and a predetermined segment size is 16 MB, then the RAID has 19,200 segments (i.e., each GB has 1024 MB. Therefore 300 times 1024, divided by 16, equals 19,200). In this example, there will be 19,200 segments to be monitored by monitoring program 104 to determine I/O distribution of the RAID. In various exemplary embodiment, each segment can be written to and read from by one or more customers. In additional embodiments, one or more customers can write data to multiple segments.

Memory structure 204A-N are the structures that describe the statistical information of the RAIDs and the segments of their corresponding rank grouping 202A-N. In an exemplary embodiment, memory structure 204A-N describe the metadata (i.e., the recording of the location or address of the segments in the RAID), the pointers that point to the bits in the RAID's bitmap 206 that indicate the different segments, and the I/O access count for the different segments and the information that will be used to determine the workload strength of the segments.

Bitmap 206 is a collection of bits that are indicators for segments of the RAID. In this exemplary embodiment, each bit in the bitmap will indicate one segment of the RAID. For example, the value of one bit could be 0 or 1. In this example, during the monitoring cycle of monitoring program 104, if a bit is set to 1, monitoring program 104 determines that the segment this bit is an indicator for was accessed for I/O purposes. If, however, during the monitoring cycle of monitoring program 104, the bit is set to 0, monitoring program 104 determines that the segment this bit is an indicator for was not accessed for I/O purposes.

Figure 3:
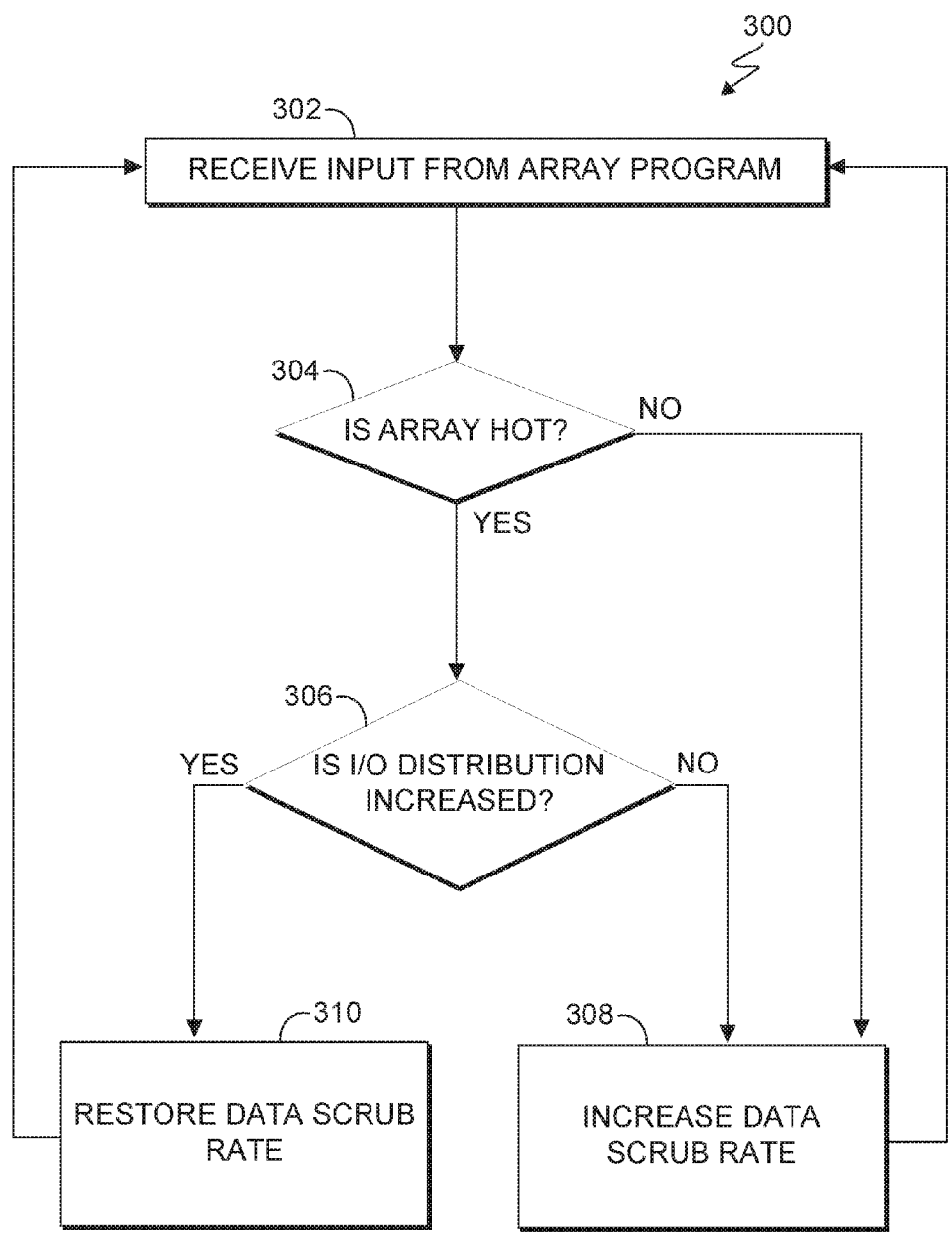
FIG. 3 is a flowchart depicting operations for detecting errors in a RAID, on a computing device within the computing environment of FIG. 1, in accordance with an embodiment of the present invention.

FIG. 3 is a flowchart depicting operations for detecting errors in a RAID, on a computing device within the computing environment of FIG. 1, in accordance with an embodiment of the present invention. For example, FIG. 3 is a flowchart depicting operations 300 of monitoring program 104, on computing device 102 within computing environment 100.

In step 302, monitoring program 104 receives an input from monitoring program 104. In some embodiments, the input includes the classification of array 112A-N, classified by array program 106. In another embodiment, the input includes a pre-defined array scrub rate. For example, a scrub rate can be set to occur at a set frequency (e.g., every two days). In some embodiments, all of the arrays are scrubbed at the same frequency. In another embodiment, based on the rankings of array program 106, an array is classified into a rank and the array scrub rate frequency is based on the ranking of the array. As described prior, array program 106 can classify multiple ranks of arrays. For example, array program 106 can classify arrays into three tiers, where the scrub rate within the tiers is set to low, medium, or high, based on the I/O of the array.

In decision step 304, monitoring program 104 determines whether the array is hot. In some embodiments, monitoring program 104 determines that an array is hot based on a temperature of the RAID, determined by a thermometer in the system. In some embodiments, an array is determined to be hot when it is above a threshold set by the system. For example, the system threshold is set to 80 degrees Fahrenheit. In this example, any array determined to be hotter than 80 degrees Fahrenheit is determined to be hot. In another embodiment, an array is determined to be hot when it is a percentage hotter than the system average. For example, the system average is 80 degrees Fahrenheit and the threshold is set at 10%. In this example, an array measuring above 88 degrees Fahrenheit will be determined to be hot. This allows monitoring program 104 to dynamically change the decision threshold based on system conditions. For example, where the system is running hotter (e.g., when the air conditioning is down), monitoring program 104 can account for the temperature change due to system conditions and not I/O changes. If monitoring program 104 determines the array is hot (e.g., step 304, YES branch), either through temperature or, in other examples, through customer I/O strength and distribution, then monitoring program 104 detects the I/O distribution for the array (e.g., step 306). If, on the other hand, monitoring program 104 determines the array is cold, or not hot, (e.g., step 304, NO branch), then monitoring program 104 increases the scrub rate of the array (e.g., step 308).

If, in decision step 304, monitoring program 104 determines that the array is hot, then, in decision step 306, monitoring program 104 determines whether the I/O distribution of the array is increasing, decreasing, or remaining constant. In some embodiments, this is determined by comparing current use and/or temperature to a historical record of the array's I/O. In another embodiment, the I/O distribution is compared to a system standard. In this embodiment, monitoring program 104 determines whether the array's I/O is above the standard, at the standard, or below the standard. In this embodiment, standard is defined by the RAID's owner, the manufacturer, the industry standard, the customer, etc.

In an exemplary embodiment, an array with an increased I/O is an indication that the array is in use by the customer. In these situations, increasing the scrub rate of the array could disturb the customer's access to the array. An array with a decreased I/O is an indication that the array is not currently in use by the customer, and an increased scrub rate would not disturb the customer's access to data. If monitoring program 104 determines the I/O has increased (decision 306, YES branch), then monitoring program 104 restores the system scrub rate (step 310). In this example, the system scrub rate is the scrub rate as defined by the owner, manufacturer, customer, etc. In this embodiment, the system defined scrub rate has a low frequency. If monitoring program 104 determines I/O has decreased or is steady (decision 306, NO branch), then monitoring program 104 increases the scrub rate of the array (step 308).

Accordingly, by performing the operational steps of FIG. 3, monitoring program 104 can monitor a RAID and dynamically vary the data scrub rate of the RAID depending on various factors. By doing so, monitoring program 104 can enhance customer access to the RAID. Additionally, monitoring program 104 can minimize the risk of data loss using these operational steps. In various embodiments, monitoring program 104 can dynamically vary the data scrub rate of the RAID by first determining whether the I/O distribution has increased and then determining the temperature of the array, that is, step 304 will be "is I/O distribution increased?" and step 306 will be "is array hot?".

Figure 4:
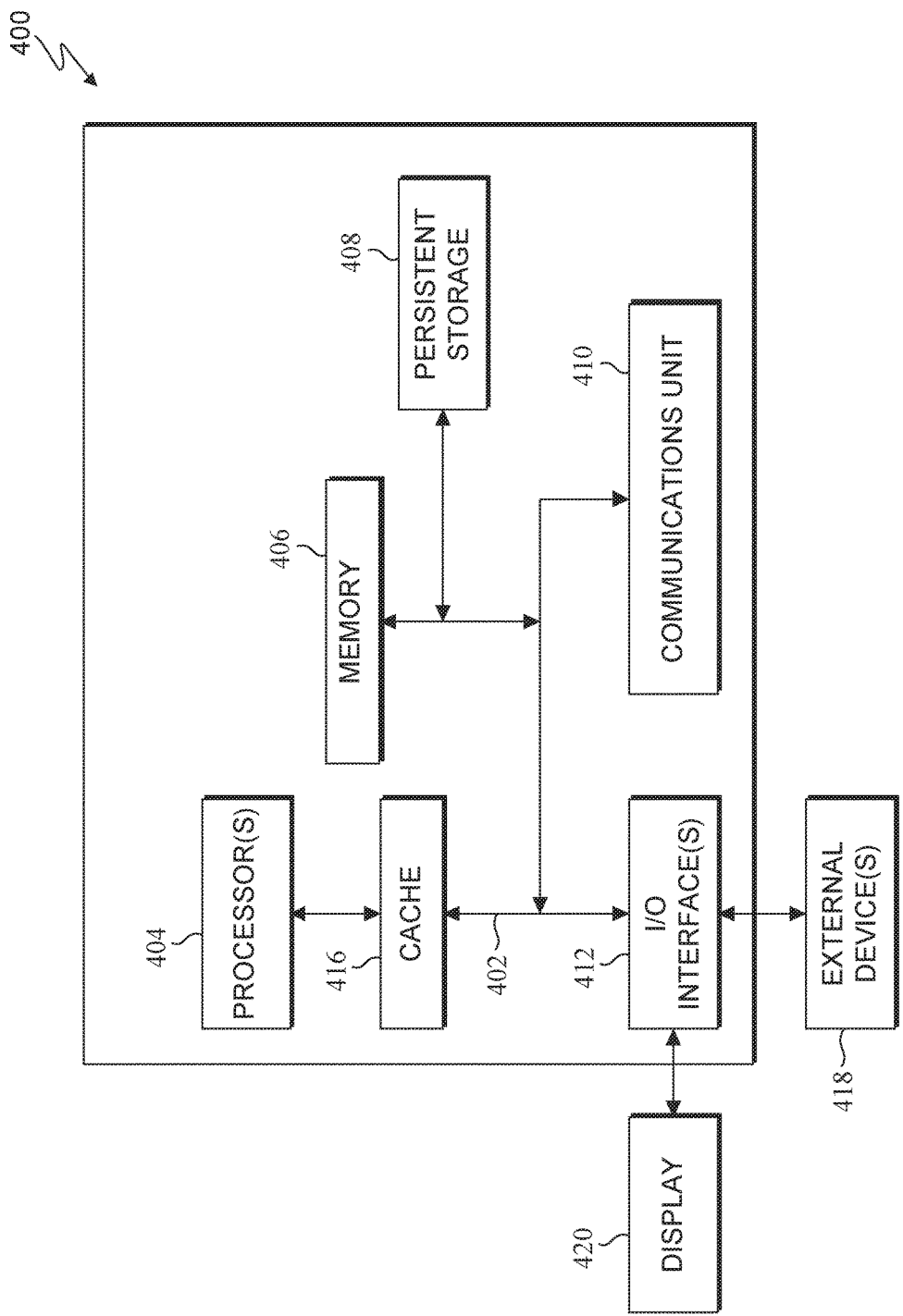
FIG. 4 is a block diagram of components of a computing device executing operations for detecting errors in a RAID, in accordance with an embodiment of the present invention.

FIG. 4 is a block diagram of components of a computing device, generally designated 400, in accordance with an embodiment of the present invention. In one embodiment, computing device 400 is representative of computing device 102 and client device 110. For example, FIG. 4 is a block diagram of computing device 102 within computing environment 100 executing operations of monitoring program 104.

It should be appreciated that FIG. 4 provides only an illustration of one implementation and does not imply any limitations with regard to the environments in which different embodiments may be implemented. Many modifications to the depicted environment may be made.

Computing device 400 includes communications fabric 408, which provides communications between computer processor(s) 402, memory 404, cache 406, persistent storage 410, communications unit 414, and input/output (I/O) interface(s) 412. Communications fabric 408 can be implemented with any architecture designed for passing data and/or control information between processors (such as microprocessors, communications and network processors, etc.), system memory, peripheral devices, and any other hardware components within a system. For example, communications fabric 408 can be implemented with one or more buses.

Memory 404 and persistent storage 410 are computer-readable storage media. In this embodiment, memory 404 includes random access memory (RAM). In general, memory 404 can include any suitable volatile or non-volatile computer readable storage media. Cache 406 is a fast memory that enhances the performance of processors 402 by holding recently accessed data, and data near recently accessed data, from memory 404.

Program instructions and data used to practice embodiments of the present invention may be stored in persistent storage 410 and in memory 404 for execution by one or more of the respective processors 402 via cache 406. In an embodiment, persistent storage 410 includes a magnetic hard disk drive. Alternatively, or in addition to a magnetic hard disk drive, persistent storage 410 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 410 may also be removable. For example, a removable hard drive may be used for persistent storage 410. Other examples include optical and magnetic disks, thumb drives, and smart cards that are inserted into a drive for transfer onto another computer-readable storage medium that is also part of persistent storage 410.

Communications unit 414, in these examples, provides for communications with other data processing systems or devices, including resources of network 120. In these examples, communications unit 414 includes one or more network interface cards. Communications unit 414 may provide communications through the use of either or both physical and wireless communications links. Program instructions and data used to practice embodiments of the present invention may be downloaded to persistent storage 410 through communications unit 414.

I/O interface(s) 412 allows for input and output of data with other devices that may be connected to computing device 400. For example, I/O interface 412 may provide a connection to external devices 416 such as a keyboard, keypad, a touch screen, and/or some other suitable input device. External devices 416 can also include portable computer-readable storage media such as, for example, thumb drives, portable optical or magnetic disks, and memory cards. Software and data used to practice embodiments of the present invention (e.g., software and data) can be stored on such portable computer-readable storage media and can be loaded onto persistent storage 410 via I/O interface(s) 412. I/O interface(s) 412 also connect to a display 418.

Display 418 provides a mechanism to display data to a user and may be, for example, a computer monitor, or a television screen.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The term(s) "Smalltalk" and the like may be subject to trademark rights in various jurisdictions throughout the world and are used here only in reference to the products or services properly denominated by the marks to the extent that such trademark rights may exist.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising modifying data scrub rates:
   determining, by one or more processors, a grouping for an array of a plurality of arrays based, at least in part, on a temperature for the array, a configurable threshold temperature range for the array, an I/O distribution of the array, use of the array, and frequency of use of the array; and
   modifying, by one or more processors, a data scrub rate for the array according to the grouping of the array.

2. The method of claim 1, wherein modifying the data scrub rate of the array comprises:
   in response to the array being grouped as exceeding the configurable threshold temperature range, determining whether the I/O distribution of the array is increasing;
   in response to the I/O distribution of the array is increasing, decreasing, by one or more processors, the data scrub rate of the array;
   in response to the I/O distribution of the array decreasing, restoring, by one or more processors, the data scrub rate of the array; and
   in response to the I/O distribution of the array remaining constant, restoring the data scrub rate of the array to a predetermined rate.

3. The method of claim 1, wherein modifying the data scrub rate of the array comprises:
   in response to the array being grouped as below the configurable temperature threshold range, increasing, by one or more processors, the data scrub rate of the array.

4. The method of claim 1, wherein modifying the data scrub rate of the array comprises:
   in response to the I/O distribution of the array being constant, maintaining, by one or more processors, the data scrub rate of the array.

5. The method of claim 1, wherein modifying the data scrub rate of the array comprises:
   in response to the I/O distribution of the array decreasing, increasing, by one or more processors, the data scrub rate of the array.

6. The method of claim 1, wherein modifying the data scrub rate of the array comprises:
   in response to the grouping of the array as the I/O distribution increasing, decreasing, by one or more processors, the data scrub rate of the array.

7. A computer program product comprising:
   one or more computer readable storage medium and program instructions stored on the computer readable storage medium, the program instructions comprising:
   program instructions to determine a grouping for an array of a plurality of arrays based, at least in part, on a temperature for the array, a configurable threshold temperature range for the array, an I/O distribution of the array, use of the array, and frequency of use of the array; and
   program instructions to modify a data scrub rate for the array according to the grouping of the array.

8. The computer program product of claim 7, wherein the program instructions to modify the data scrub rate of the array comprise:
   in response to the array being grouped as exceeding the configurable threshold temperature range, program instructions to determine whether the I/O distribution of the array is increasing;
   in response to the I/O distribution of the array is increasing, program instructions to decrease, the data scrub rate of the array;
   in response to the I/O distribution of the array decreasing, program instructions to restore the data scrub rate of the array; and
   in response to the I/O distribution of the array remaining constant, program instructions to restore the data scrub rate of the array to a predetermined rate.

9. The computer program product of claim 7, wherein the program instructions to modify the data scrub rate of the array comprise:
   in response to the array being grouped as below the configurable temperature threshold range, program instructions to increase the data scrub rate of the array.

10. The computer program product of claim 7, wherein the program instructions to modify the data scrub rate of the array comprise:
    in response to the I/O distribution of the array being constant, program instructions to maintain the data scrub rate of the array.

11. The computer program product of claim 7, wherein the program instructions to modify the data scrub rate of the array comprise:
    in response to the I/O distribution of the array decreasing, program instructions to increase the data scrub rate of the array.

12. The computer program product of claim 7, wherein the program instructions to modify the data scrub rate of the array comprise:

in response to the grouping of the array as the I/O distribution increasing, program instructions to decrease the data scrub rate of the array.

13. A computer system comprising:
one or more computer processors;
one or more computer readable storage media;
program instructions stored on the one or more computer readable storage media for execution by at least one of the one or more processors, the program instructions comprising:
program instructions to determine a grouping for an array of a plurality of arrays based, at least in part, on a temperature for the array, a configurable threshold temperature range for the array, an I/O distribution of the array, use of the array, and frequency of use of the array; and
program instructions to modify a data scrub rate for the array according to the grouping of the array.

14. The computer system of claim 13, wherein the program instructions to modify the data scrub rate of the array comprise:

in response to the array being grouped as exceeding the configurable threshold temperature range, program instructions to determine whether the I/O distribution of the array is increasing;

in response to the I/O distribution of the array is increasing, program instructions to decrease, the data scrub rate of the array;

in response to the I/O distribution of the array decreasing, program instructions to restore the data scrub rate of the array; and in response to the I/O distribution of the array remaining constant, program instructions to restore the data scrub rate of the array to a predetermined rate.

15. The computer system of claim 13, wherein the program instructions to modify the data scrub rate of the array comprise:

in response to the array being grouped as below the configurable temperature threshold range, program instructions to increase the data scrub rate of the array.

16. The computer system of claim 13, wherein the program instructions to modify the data scrub rate of the array comprise:

in response to the I/O distribution of the array decreasing, program instructions to increase the data scrub rate of the array.

17. The computer system of claim 13, wherein the program instructions to modify the data scrub rate of the array comprise:

in response to the grouping of the array as the I/O distribution increasing, program instructions to decrease the data scrub rate of the array.

\* \* \* \* \*